(12) United States Patent
Van Horn et al.

(10) Patent No.: US 8,557,136 B2
(45) Date of Patent: Oct. 15, 2013

(54) AZEOTROPE AND AZEOTROPE-LIKE COMPOSITIONS OF 1-CHLORO-3,3,3-TRIFLUOROPROPENE AND HCFC-123

(75) Inventors: Brett L. Van Horn, King of Prussia, PA (US); Philippe Bonnet, Lyons (FR); Benjamin Bin Chen, Wayne, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 13/389,817

(22) PCT Filed: Aug. 13, 2009

(86) PCT No.: PCT/US2009/053695
§ 371 (c)(1), (2), (4) Date: Feb. 10, 2012

(87) PCT Pub. No.: WO2011/019350
PCT Pub. Date: Feb. 17, 2011

(65) Prior Publication Data
US 2012/0138846 A1     Jun. 7, 2012

(51) Int. Cl.
*C09K 5/04* (2006.01)

(52) U.S. Cl.
USPC .......................................................... 252/67

(58) Field of Classification Search
USPC ........................................................ 252/67
See application file for complete search history.

(56) References Cited

U.S. PATENT DOCUMENTS

| | | | |
|---|---|---|---|
| 5,227,245 A * | 7/1993 | Brands et al. | 428/483 |
| 5,318,716 A | 6/1994 | Bartlett et al. | |
| 6,673,976 B1 | 1/2004 | Nair et al. | |
| 7,442,321 B1 | 10/2008 | Chen et al. | |
| 2006/0058560 A1 | 3/2006 | Moscoe | |
| 2009/0041677 A1 * | 2/2009 | Singh et al. | 424/40 |
| 2009/0305876 A1 * | 12/2009 | Singh et al. | 502/150 |
| 2010/0048961 A1 * | 2/2010 | Merkel et al. | 570/160 |

FOREIGN PATENT DOCUMENTS

| | | | |
|---|---|---|---|
| WO | WO 2004/037913 A2 | 5/2004 | |
| WO | WO 2009/114397 A2 | 9/2009 | |
| WO | WO 2009/114397 A3 | 9/2009 | |

OTHER PUBLICATIONS

M. S. Kim et al., "A Study to Determine the Existence of an Azeotropic R-22 'Drop-In' Substitute", NISTIR 5784, US Dept. of Commerce, Mar. 1996.*

Sweeny, K.A. and Chato, J.J., The Behavior of a Near-Azeotropic Refrigerant Mixture of R-32/R-125 in an Enhanced Tube., ACRC RT-94., Apr. 1996 pp. 1-17.

* cited by examiner

*Primary Examiner* — John Hardee
(74) *Attorney, Agent, or Firm* — Steven D. Boyd

(57) ABSTRACT

Provided are azeotrope or azeotrope-like compositions comprised of 1-chloro-3,3,3-trifluoropropene (HCFO-1233zd) and 1,1-dichloro-2,2,2-trifluoroethane (HCFC-123).

16 Claims, 1 Drawing Sheet trans-HCFO-123zd Ln P vs. 1000/T
E1233zd

HCFC-123 Ln P vs. 1000/T
HCFC123

AZEOTROPE AND AZEOTROPE-LIKE COMPOSITIONS OF 1-CHLORO-3,3,3-TRIFLUOROPROPENE AND HCFC-123

FIELD OF INVENTION

The present invention relates to azeotrope and azeotrope-like compositions comprising 1-chloro-3,3,3-trifluoropropene (HCFO-1233zd) and 1,1-dichloro-2,2,2-trifluoroethane (HCFC-123), and uses thereof.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential. Additionally, the use of single component fluids or azeotropic mixtures, which do not fractionate on boiling and evaporation, is desirable. However, the identification of new, environmentally safe, non-fractionating mixtures is complicated due to the fact that azeotrope formation is not readily predictable.

The object of the present invention is to provide novel compositions that can serve as refrigerants, heat transfer fluids, blowing agents, solvents, de-fluxing agents, degreasers, aerosols, etc. that further provide a reduction in the global warming and/or ozone depletion potential of the HCFC and HFC alternatives.

DESCRIPTION OF PREFERRED EMBODIMENTS

Figure 1:
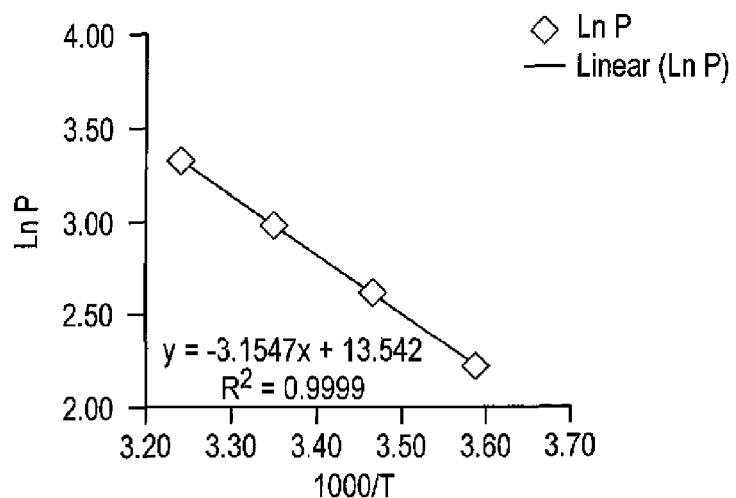
FIG. 1 is a plot of LnP versus 1000/T for tans-HCFO-1233zd

The present inventors have developed several compositions that help to satisfy the continuing need for alternatives to CFCs and HCFCs. According to certain embodiments, the present invention provides azeotrope or azeotrope-like compositions comprising 1-chloro-3,3,3-trifluoropropene (HCFO-1233zd) and 1,1-dichloro-2,2,2-trifluoroethane (HCFC-123).

1-chloro-3,3,3-trifluoropropene exists in two stereoisomers: cis- and trans-. As used herein, 1-chloro-3,3,3-trifluoropropene (HCFO-1233zd) refers to a mixture of cis- and trans isomers containing predominantly the trans-isomer. Trans-1-chloro-3,3,3-trifluoropropene (trans-HCFO-1233zd) refers to essentially the trans-isomer, that is about 99% to essentially pure the trans-isomer of HCFO-1233zd.

The preferred compositions of the invention tend both to be low- to non-flammable and to exhibit relatively low global warming potentials ("GWPs"). Accordingly, applicants have recognized that such compositions can be used to great advantage in a number of applications, including as replacements for CFCs, HCFCs, and HFCs (such as HCFC-141b, HCFC-123, HFC-245fa, HFC-365mfc etc.) in refrigerant, aerosol, and other applications.

Additionally, applicants have recognized surprisingly that azeotrope or azeotrope-like compositions of HCFO-1233zd with HCFC-123 can be formed. Accordingly, in other embodiments, the present invention provides methods of producing an azeotrope-like composition comprising combining HCFO-1233zd with HCFC-123 in amounts effective to produce an azeotrope-like composition.

In addition, applicants have recognized that the azeotrope-like compositions of the present invention exhibit properties that make them advantageous for use as, or in, refrigerant compositions, solvents, and in foam blowing agents. Accordingly, in yet other embodiments, the present invention provides refrigerant compositions and/or foam blowing agents, and solvents comprising an azeotrope-like composition of HCFO-1233zd and HCFC-123.

Azeotrope-Like Compositions

As used herein, the term "azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant boiling and cannot be separated during a phase change.

The azeotrope-like compositions of the present invention may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

It is well recognized in the art that it is not possible to predict the formation of azeotropes. Applicants have discovered unexpectedly that HCFO-1233zd and HCFC-123 form azeotrope or azeotrope-like compositions.

According to certain preferred embodiments, the azeotrope or azeotrope-like compositions of the present invention comprise, and preferably consist essentially of, effective azeotrope or azeotrope-like amounts of HCFO-1233zd and HCFC-123. The term "effective azeotrope-like amounts" as used herein refers to the amount of each component that upon combination with the other components, results in the formation of an azeotrope-like composition of the present invention. Preferably, the present azeotrope-like compositions comprise, and preferably consist essentially of, from about 99.9 to about 1 mole percent HCFO-1233zd and from about 0.1 to about 99 mole percent of HCFC-123. Preferably, the azeotrope-like compositions comprise from about 99.7 to 85 mole percent HCFO-1233zd and from about 0.3 to about 15 mole percent HCFC-123. More preferably from about 99.7 to 87 mole percent HCFO-1233zd and from about 0.3 to about 13 mole percent HCFC-123. More preferably from about 99.7 to 94 mole percent HCFO-1233zd and from about 0.3 to about 6 mole percent HCFC-123. Even more preferably, the azeotrope-like compositions of the present invention comprise about 99.5 to about 97 mole percent HCFO-1233zd and from about 0.5 to about 3 mole percent HCFC-123. Even more preferably, the azeotrope-like compositions of the present invention comprise about 99 to about 98 mole percent HCFO-1233zd and from about 1 to about 2 mole percent HCFC-123. Unless otherwise indicated, the mole percents disclosed herein are based on the total moles of HCFO-1233zd and HCFC-123 in a composition.

The azeotrope-like compositions of the present invention can be produced by combining effective azeotrope or azeotrope-like amounts of HCFO-1233zd and HCFC-123. Any of a wide variety of methods known in the art for combining two or more components to form a composition can be adapted for use in the present methods to produce an azeotrope-like composition. For example, HCFO-1233zd and HCFC-123 can be mixed, blended, or otherwise contacted by hand and/or by machine, as part of a batch or continuous reaction and/or process, or via combinations of two or more such steps. In light of the disclosure herein, those of skill in the art will be readily able to prepare azeotrope-like compositions according to the present invention without undue experimentation.

Composition Additives

The azeotrope or azeotrope-like compositions of the present invention may further include any of a variety of optional additives including stabilizers, metal passivators, corrosion inhibitors, and the like.

In certain preferred embodiments, the compositions of the present invention further comprise a lubricant. Any of a variety of conventional lubricants may be used in the compositions of the present invention. An important requirement for the lubricant is that, when in use in a refrigerant system, there must be sufficient lubricant returning to the compressor of the system such that the compressor is lubricated. Thus, suitability of a lubricant for any given system is determined partly by the refrigerant/lubricant characteristics and partly by the characteristics of the system in which it is intended to be used. Examples of suitable lubricants include mineral oil, alkyl benzenes, polyol esters, including polyalkylene glycols, PAG oil, and the like. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate which is available as Emery 2917 (registered trademark) and Hatcol 2370 (registered trademark). Other useful esters include phosphate esters, dibasic acid esters, and fluoroesters. Preferred lubricants include polyalkylene glycols and esters. Certain more preferred lubricants include polyalkylene glycols.

Uses of the Compositions

The present compositions have utility in a wide range of applications. For example, one embodiment of the present invention relates to refrigerant compositions comprising the present azeotrope-like compositions.

The refrigerant compositions of the present invention may be used in any of a wide variety of refrigeration systems including air-conditioning, refrigeration, heat-pump, chiller, HVAC systems, and the like. In certain preferred embodiments, the compositions of the present invention are used in refrigeration systems originally designed for use with an HCFC refrigerant, such as, for example, HCFC-123. The preferred compositions of the present invention tend to exhibit many of the desirable characteristics of HCFC-123 and other HFC refrigerants, including a GWP that is as low, or lower than that of conventional HFC refrigerants. In addition, the relatively constant boiling nature of the compositions of the present invention makes them even more desirable than certain conventional HFCs for use as refrigerants in many applications.

In certain other preferred embodiments, the present compositions are used in refrigeration systems originally designed for use with a CFC-refrigerant. Preferred refrigeration compositions of the present invention may be used in refrigeration systems containing a lubricant used conventionally with CFC-refrigerants, such as mineral oils, silicone oils, polyalkylene glycol oils, and the like, or may be used with other lubricants traditionally used with HFC refrigerants. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Any of a wide range of methods for introducing the present refrigerant compositions to a refrigeration system can be used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can be monitored. When a desired amount of refrigerant composition has been introduced into the system, charging is stopped. Alternatively, a wide range of charging tools, known to those of skill in the art, is commercially available. Accordingly, in light of the above disclosure, those of skill in the art will be readily able to introduce the refrigerant compositions of the present invention into refrigeration systems according to the present invention without undue experimentation.

According to certain other embodiments, the present invention provides refrigeration systems comprising a refrigerant of the present invention and methods of producing heating or cooling by condensing and/or evaporating a composition of the present invention. In certain preferred embodiments, the methods for cooling an article according to the present invention comprise condensing a refrigerant composition comprising an azeotrope-like composition of the present invention and thereafter evaporating said refrigerant composition in the vicinity of the article to be cooled. Certain preferred methods for heating an article comprise condensing a refrigerant composition comprising an azeotrope-like composition of the present invention in the vicinity of the article to be heated and thereafter evaporating said refrigerant composition. In light of the disclosure herein, those of skill in the art will be readily able to heat and cool articles according to the present inventions without undue experimentation.

The azeotrope-like compositions of the present invention are particularly useful as refrigerants for chillers, preferably chillers with centrifugal compressors, and even more preferably chillers with centrifugal compressors and flooded type evaporators. An example is as a replacement or retrofit for HCFC-123 in chillers. An azeotrope-like composition of the present invention when used as a retrofit for HCFC-123 in chillers can be prepared by first removing all or part of the HCFC-123 an existing chiller system and then charging said system with either HCFO-1233zd or a combination of HCFO-1233zd and HCFC-123 to produce an azeotrope-like composition of the present invention in the chiller system.

In another embodiment, the azeotrope-like compositions of this invention may be used as propellants in sprayable compositions, either alone or in combination with known propellants. The propellant composition comprises, more preferably consists essentially of, and, even more preferably, consists of the azeotrope-like compositions of the invention. The active ingredient to be sprayed together with inert ingredients, solvents, and other materials may also be present in the sprayable mixture. Preferably, the sprayable composition is an aerosol. Suitable active materials to be sprayed include, without limitation, cosmetic materials such as deodorants, perfumes, hair sprays, cleansers, and polishing agents as well as medicinal materials such as anti-asthma and anti-halitosis medications.

Yet another embodiment of the present invention relates to a blowing agent comprising one or more azeotrope-like compositions of the invention. In other embodiments, the invention provides foamable compositions, and preferably polyurethane and polyisocyanurate foam compositions, and methods of preparing foams. In such foam embodiments, one or more of the present azeotrope-like compositions are included as a blowing agent in a foamable composition, which composition preferably includes one or more additional components capable of reacting and foaming under the proper conditions to form a foam or cellular structure, as is well known in the art. Any of the methods well known in the art, may be used or adapted for use in accordance with the foam embodiments of the present invention.

Another embodiment of this invention relates to a process for preparing a foamed thermoplastic product is as follows: Prepare a foamable polymer composition by blending together components comprising foamable polymer composition in any order. Typically, a foamable polymer composition is prepared by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin to or near to its glass transition temperature (Tg), or melt temperature (Tm) for crystalline polymers.

Other uses of the present azeotrope-like compositions include use as solvents, cleaning agents, de-fluxing agents, degreasers, flushing agents, and the like. Examples include vapor degreasing, precision cleaning, electronics cleaning, drying cleaning, solvent etching cleaning, carrier solvents for depositing lubricants and release agents, and other solvent or surface treatment. Those of skill in the art will be readily able to adapt the present compositions for use in such applications without undue experimentation.

EXAMPLES

The invention is further illustrated in the following examples which are intended to be illustrative, but not limiting in any manner.

Example 1

A high-pressure cell equipped with a certified pressure gauge was evacuated by a vacuum pump to remove all permanent gases. 8.12 g of trans-HCFO-1233zd was then loaded into the cell by a stainless steel syringe pump. The metal bomb was placed in an orbital shaker in which temperature was controlled at the accuracy of 0.1° C. Pressure was measured at 5, 15, 25 and 35° C. At each temperature the pressure was measured after minimum one hour in order to achieve equilibrium. The accuracy of the pressure gauge was + or −0.1 psia. In order to confirm permanent gases were not interfering with the pressure measurement, ln P was plotted against 1000/T. A good linear fit was achieved with $R^2$=0.9999, indicating no permanent gases were involved as shown in FIG. 1.

Boiling point can be calculated using the following equation assuming the ambient pressure is 14.7 psia, Ln P=a+b/T.

From the plot of ln P against 1000/T, the boiling point of trans-HCFO-1233zd is 17.64° C.

Example 2

Figure 2:
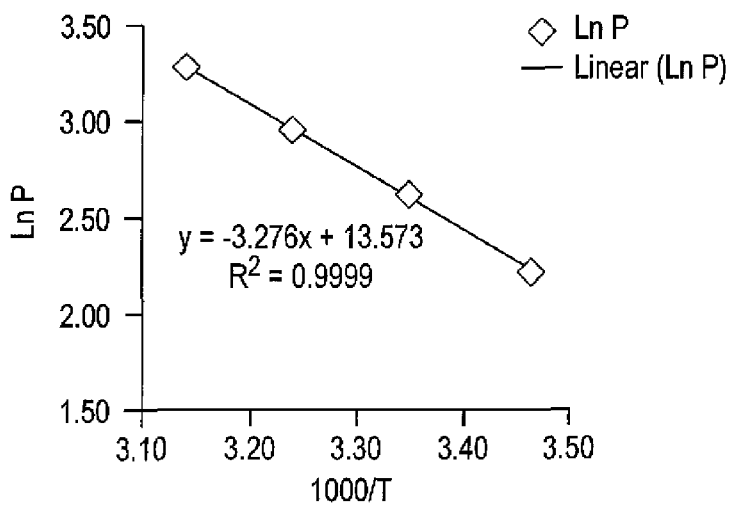
FIG. 2 is a plot of LnP versus 1000/T for HCFC-123.

Following the procedures as in Example 1, 10.28 g of HCFC-123 was loaded into the cell by a stainless steel syringe pump. Pressure was measured at 15, 25, 35 and 45° C. and LnP versus 1000/T plotted as shown in FIG. 2.

Using the same method as in the Example 1, at 14.7 psia the boiling point of HCFC-123 is 27.96° C. This is consistent with the literature.

Example 3

A known amount of trans-HCFO-1233zd was added to a test cell and desired amounts of HCFC-123 were added into the cell using the same method as in Examples 1 and 2. For each composition the pressure was measured at at least four temperatures. The composition was incrementally varied from 1.00 to 0.50 mole fraction of trans-HCFO-1233zd and 0.00 to 0.50 mole fraction HCFC-123. The procedure was repeated using another cell and another known amount of trans-HCFO-1233zd; the compositions reached were 0.99, 0.97, 0.95, and 0.93 mole fraction trans-HCFO-1233zd and 0.01, 0.03, 0.05, and 0.07 mole fraction HCFC-123. To another cell was added a known amount of HCFC-123. Desired amounts of trans-HCFO-1233zd were then added to the cell using the same method as in Examples 1 and 2. At each composition the pressure was measured at at least four temperatures. The composition was incrementally varied from 1.00 to 0.45 mole fraction of HCFC-123 and 0.00 to 0.50 mole fraction trans-HCFO-1233zd.

The boiling points were calculated and the results summarized in Table 1.

TABLE 1

| Mole Fraction HCFO-1233zd | Mole Fraction HCFC-123 | Boiling Point (° C.) |
|---|---|---|
| 1.00 | 0.00 | 17.64 |
| 0.99 | 0.01 | 17.53 |

TABLE 1-continued

| Mole Fraction HCFO-1233zd | Mole Fraction HCFC-123 | Boiling Point (° C.) |
|---|---|---|
| 0.98 | 0.02 | 17.53 |
| 0.97 | 0.03 | 17.70 |
| 0.96 | 0.04 | 17.76 |
| 0.95 | 0.05 | 17.89 |
| 0.94 | 0.06 | 17.89 |
| 0.93 | 0.07 | 17.92 |
| 0.92 | 0.08 | 18.12 |
| 0.90 | 0.10 | 18.12 |
| 0.87 | 0.13 | 18.34 |
| 0.84 | 0.16 | 18.71 |
| 0.81 | 0.19 | 18.76 |
| 0.76 | 0.24 | 19.19 |
| 0.71 | 0.29 | 19.58 |
| 0.66 | 0.34 | 20.03 |
| 0.61 | 0.39 | 20.26 |
| 0.55 | 0.45 | 20.56 |
| 0.50 | 0.50 | 20.83 |
| 0.45 | 0.55 | 21.42 |
| 0.40 | 0.60 | 22.89 |
| 0.35 | 0.65 | 23.70 |
| 0.30 | 0.70 | 24.46 |
| 0.25 | 0.75 | 24.46 |
| 0.18 | 0.82 | 25.39 |
| 0.11 | 0.89 | 26.45 |
| 0.06 | 0.94 | 27.12 |
| 0.00 | 1.00 | 27.96 |

The data in Table 1 shows the azeotrope like properties of the combination of the present invention.

What is claimed is:

1. An azeotrope-like composition comprising effective amounts of 1-chloro-3,3,3-trifluoropropene (HCFO-1233zd) and 1,1-dichloro-2,2,2-trifluoroethane (HCFC-123).

2. The azeotrope-like composition of claim 1 which consists essentially of from about 99.9 to about 1 mole percent 1-chloro-3,3,3-trifluoropropene, and from about 0.1 to about 99 mole percent of 1,1-dichloro-2,2,2-trifluoroethane.

3. The azeotrope-like composition of claim 1 which consists essentially of from about 99.7 to about 85 mole percent 1-chloro-3,3,3-trifluoropropene, and from about 0.3 to about 15 mole percent of 1,1-dichloro-2,2,2-trifluoroethane.

4. The azeotrope-like composition of claim 3 having a boiling point of from about 17.5° C. to about 18.5° C. at a pressure of about 14.7 psia.

5. The composition of claim 1 further comprising a lubricant.

6. The composition of claim 5 wherein said lubricant is selected from the group consisting of mineral oil, alkyl benzenes, polyol esters, polyalkylene glycols, polyvinyl ethers, polyalpha olefins, and combinations of two or more thereof.

7. A heat transfer composition comprising an azeotrope-like composition of claim 1.

8. A refrigeration, air conditioning, chilling, or heat pump system comprising a heat transfer composition of claim 7.

9. A method for cooling an article which comprises condensing a heat transfer composition of claim 7 and thereafter evaporating said refrigerant composition in the vicinity of the article to be cooled.

10. A method for heating an article which comprises condensing a heat transfer composition of claim 7 in the vicinity of the article to be heated and thereafter evaporating said refrigerant composition.

11. A sprayable composition comprising a material to be sprayed and a propellant comprising an azeotrope-like composition of claim 1.

12. A sprayable composition according to claim 11 wherein the sprayable composition is an aerosol.

13. A blowing agent comprising an azeotrope-like composition of claim 1.

14. A foamable pre-mix formulation comprising the blowing agent of claim 13 and a polyol.

15. The foamable pre-mix formulation of claim 14 further comprising at least one additive selected from the group consisting of surfactants, catalysts, compatibilizers, flame retardants, UV stabilizers, and mixtures thereof.

16. A solvent comprising an azeotrope-like composition of claim 1.

* * * * *